(12) United States Patent
Kyösti

(10) Patent No.: US 7,317,751 B2
(45) Date of Patent: Jan. 8, 2008

(54) METHOD AND DEVICE FOR ESTIMATING SIR OF A SIGNAL

(75) Inventor: Pekka Kyösti, Oulu (FI)

(73) Assignee: Nokia Corporation, Espoo (FI)

( * ) Notice: Subject to any disclaimer, the term of this patent is extended or adjusted under 35 U.S.C. 154(b) by 575 days.

(21) Appl. No.: 10/475,775

(22) PCT Filed: Apr. 24, 2001

(86) PCT No.: PCT/EP01/04622

§ 371 (c)(1),
(2), (4) Date: Oct. 23, 2003

(87) PCT Pub. No.: WO02/087106

PCT Pub. Date: Oct. 31, 2002

(65) Prior Publication Data

US 2004/0131108 A1    Jul. 8, 2004

(51) Int. Cl.
*H04B 1/00* (2006.01)
(52) U.S. Cl. .................. 375/148; 375/200; 379/399.1; 455/277.2
(58) Field of Classification Search ............... 375/148, 375/200; 379/399.1; 455/277.2
See application file for complete search history.

(56) References Cited

U.S. PATENT DOCUMENTS 6,035,006 A * 3/2000 Matui ...................... 375/340
6,047,007 A * 4/2000 Munday et al. ............. 370/545
6,130,907 A * 10/2000 Chen ......................... 370/342
6,470,059 B2 * 10/2002 Starr ........................... 375/350
6,816,717 B1 * 11/2004 Sipila ...................... 455/277.2
2001/0021198 A1 * 9/2001 Hsu et al. ................... 370/477
2001/0050987 A1 * 12/2001 Yeap et al. ............. 379/399.01

FOREIGN PATENT DOCUMENTS

| EP | 1033824 A2 | 9/2000 |
|---|---|---|
| WO | 00/77946 | 12/2000 |
| WO | 01/28124 A1 | 4/2001 |

OTHER PUBLICATIONS

Chih-Wei Wang and Li-Chun Wang, "Signal to Interference Ratio Measurement Techniques for CDMA Cellular Systems in a Frequency-Selective Multipath Fading Channel," Third IEEE Signal Processing Workshop on Signal Processing Advances in Wireless Communication, Mar. 20-23, 2001, pp. 34-27, XP002902190, Taoyuan, Taiwan.

* cited by examiner

*Primary Examiner*—David C. Payne
*Assistant Examiner*—Nader Bolourchi
(74) *Attorney, Agent, or Firm*—Squire, Sanders & Dempsey L.L.P.

(57) ABSTRACT

Disclosed is a method and a device for estimating the signal to interference ratio of a signal, in particular in a base station of a WCDMA system, providing at least a first estimating process and a second estimating process, wherein for current use with the signal a selection among said estimating processes is made in accordance with a current characteristic or current characteristics of the signal so that an estimating process is selected which is most suitable in view of the current characteristic(s) of the signal.

13 Claims, 1 Drawing Sheet

METHOD AND DEVICE FOR ESTIMATING SIR OF A SIGNAL

FIELD OF THE INVENTION

The present invention relates to a method and a device for estimating the signal to inference ratio (SIR) of a signal, in particular in a base station of a wideband code division multiple access (WCDMA) system where the method and the device are used for a radio links.

BACKGROUND OF THE INVENTION

SIR must be evaluated in the receiver of WCDMA systems. A good estimate of SIR is needed mainly for fast power control and also for radio resource management. Implementation point of view is that the SIR estimation should be computationally as simple as possible since it has to be done every time slot for every radio link connection.

The estimation of SIR requires the estimation of signal power and of interference power. There are two main categories of methods to estimate SIR, namely one with wideband interference estimation and another with narrowband interference estimation. The wideband interference estimation is calculated from the wideband signal which is the signal before despreading. The narrowband interference estimation is calculated from the narrowband signal which is the signal after despreading. In the following, both methods are introduced shortly, by discribing one possible implementation of these methods (although there are further possible implementations which, however, are not mentioned here):

1. SIR Estimation with Wideband Interference Estimate:

The signal to interference ratio is described by the following equation:

$$SIR = \frac{SF_{DPCCH} \cdot S}{I_0 + I_r} \quad (1)$$

where

S is the received signal power of a dedicated physical control channel (DPCCH), $SF_{DPCCH}$ is the processing gain of the DPCCH channel, $I_r$ is the wideband interference originating from own cell, $I_0$ is the wideband interference from other cells including the system thermal noise.

Equation (1) needs the estimation of the signal power and the interference power.

The signal power is calculated from despread pilot symbols separately for each antenna using the following equation:

$$\hat{S} = \sum_{k=1}^{L} \hat{S}_k = \sum_{k=1}^{L} \left| \frac{1}{N_p} \sum_{i=1}^{N_p} z_{k,i} \right|^2 \quad (2)$$

where

L is the number of allocated fingers for current antenna (number of received paths), $N_p$ is the number of pilot symbols, z is the sample of the DPCCH channel from which the pilot modulation is removed, Samples z are complex values and there are $N_p$ number of them. It has to be noted that the signal power estimate S is biased by the second term in the following equation:

$$E(\hat{S}) = S + \frac{(I_0 + I_r) \cdot L}{N_p \cdot SF_{DPCCH}} \quad (3)$$

The wideband power per antenna is calculated from the received signal by the following equation:

$$\hat{P}_w = \frac{1}{N} \sum_{i=1}^{N} |r_i|^2 \quad (4)$$

where

N is the number of samples in one time slot, r is the sample of the received signal after a pulse shape filter and AGC on current antenna.

The interference for equation (1) is obtained from wideband power measurement using the following equation:

$$E(\hat{P}) = S + I_0 + I_r \quad (5)$$

So, the SIR estimate for one antenna is calculated by the following equation:

$$\hat{SIR} = SF_{DPCCH} \cdot \frac{\hat{S} - \frac{L}{N_p \cdot SF_{DPCCH}} \cdot \hat{P}_w}{\hat{P}_w - \hat{S}} \quad (6)$$

where all the symbols are as defined above.

The final SIR estimate is the sum of all antennawise estimates $\hat{SIR}$ from equation (6).

The SIR estimation with wideband interference estimate is computationally not very complex. Complexity of wideband interference estimation increases directly proportional only to the number of receiver antennas. Only one value $P_w$ per antenna is to be calculated and can be used for every connection (code channel) and every multipath. So, this method allows a simple implementation. A further advantage of this method is that only a small variance occurs.

However, a major drawback of this method is the biasing on very high bit rates, making it almost useless with high bit rates signal connections (approaching 2 Mb/s). The orthogonal share of the signal power should be removed from the wideband noise, but in real case neither the power ratio nor the orthogonality coefficient are unfortunately known. Because the orthogonal data channel power is not removed, in the equation (6), the numerator remains too small and the denominator too big. Thus SIR estimate remains too small, and the error grows with high SIR values and high bit rates. With high SIR values, noise power becomes small and unremoved share of the signal power starts to play an important role in wideband noise estimate. With high bit rates, power ratio becomes very small. Thus, the Unremoved share of the signal power becomes remarkable.

2. SIR Estimation with Narrowband Interference Estimate:

The signal to interference ratio is described by the following equation:

$$SIR = \frac{S}{I} \quad (7)$$

where
S is the received signal power of a DPCCH channel,
I is the interference power including the system thermal noise (measured from the narrowband signal).

Here again, equation (7) needs the estimation of the signal power and the interference power.

The signal power is calculated according to the above equation (2). It has to be noted that the signal power estimate $\hat{S}$ is biased. The bias can be removed after the antennawise noise and interference power is estimated. The unbiased signal power estimate is $$\hat{S}_{ub} = \sum_{k=1}^{L} \left| \frac{1}{N_p} \sum_{i=1}^{N_p} z_{k,i} \right|^2 - \left( \frac{L \cdot I}{N_p} \right). \quad (8)$$

In the minimum variance unbiased (MVU) estimation method, the noise and interference power is estimated from the narrowband received, despread and demodulated signal $z_{k,i}$. The rationale behind this is as follows: Under the assumption that the power of the transmitted narrowband signal and the channel power stay constant for the calculation period (one timeslot) the variance of the received signal is actually equal to the variance of the noise and interference. For additive white Gaussian noise (AWGN) and interference, this in turn equals to the power of the noise and the interference.

It must be noted that here two assumptions have been made, one about the transmitted signal power, and another about the channel power. Since the transmit power control (TPC) period is one timeslot, the first assumption is right; the transmitted signal power stays constant over the calculation period. The validity of the second assumption depends on the channel, and the biggest error from the ideal situation would be for a fading channel with a very high Doppler frequency, so that the channel power changes significantly over one timeslot.

By definition variance is $$\hat{\sigma}^2 = E(|X - E(X)|^2), \quad (9)$$

but it can be also calculated by $$\hat{\sigma}^2 = E(|X|^2) - |E(X)|^2, \quad (10)$$

$|E(X)|^2$ has already been calculated in the above equation (2) since the term $E(|X|^2)$ corresponds to $$\frac{1}{N_p} \cdot \sum_{i=1}^{N_p} z_{k,i} \cdot z_{k,i}^*, \quad (11)$$

where $z_{k,i}^*$ is the complex conjugate of the despread and demodulated pilot symbol.

The estimate of the interference and noise power of finger k can be now written by substituting equation (11) and $$\text{term } \hat{S}_k = \left| \frac{1}{N_p} \sum_{i=1}^{N_p} z_{k,i} \right|^2$$

from equation (8) to equation (10)

$$\hat{I}_k = \left( \frac{1}{N_p} \cdot \sum_{i=1}^{N_p} z_{k,i} \cdot z_{k,i}^* \right) - \hat{S}_k \quad (12)$$

To reduce the variance of the interference and noise power estimate $$\hat{I} = \frac{1}{L} \cdot \sum_{k=1}^{L} \hat{I}_k \quad (13)$$

of a current antenna, it is filtered using a 1-tap IIR filter with effective length of 4 timeslots, resulting in the following equation:

$$\hat{I}_{filt}(t) = \kappa \cdot \hat{I}(t) + (1-\kappa) \cdot \hat{I}(t-1) \quad (14)$$

Here time index t refers to a current timeslot and (t−1) to a previous timeslot (mark fit $\hat{I}_{filt} = \hat{I}_{filt}(t)$ The Kalman gain κ of the filter should be 0.25.

So, the SIR estimate for one antenna is calculated by the following equation $$\hat{SIR} = \frac{\hat{S}_{ub}}{\hat{I}_{filt}} = \frac{\sum_{k=1}^{L} \hat{S}_k - \left( L \cdot \hat{I}_{filt} / N_p \right)}{\hat{I}_{filt}}, \quad (15)$$

where all the symbols are as defined above.

The final SIR estimate is sum of all antennawise estimates SIR from equation (15).

The narrowband interference based SIR estimation doesn't have any biasing problems described above in conjunction with the wideband interference estimate.

However, it is computationally more complex than the above mentioned wideband interference method. Complexity of interference estimate increases directly proportional to the number of receiver antennas, number of connections (code channel), number of received paths per connection (different delays) and number of pilot bits. A further drawback is that the narrowband interference estimate has a high variance so that a high effort filtering is required which takes a certain time, but filtering causes error in case of a very fast fluctuation of the interference level; the latter case would be for exemple the presence of an other user in the same cell with a package data connection (CPCH).

SUMMARY OF THE INVENTION

It is an object of the present invention to provide a method and a device for SIR estimation which are suitable for processing of signals having different characteristics, in particular of first signals having a high bit rate and of second signals having a low bit rate, wherein the above mentioned drawbacks are essentially overcome and in particular wherein the computing load is reasonable low and a good quality of SIR estimate is maintained for all signals to be processed.

In order to achieve this and other objects, in accordance with a first aspect of the present invention, there is provided a method for estimating the signal to interference ratio of a signal, in particular in a base station of a WCDMA system, providing at least a first estimating process and a second estimating process, wherein for current use with the signal a selection among said estimating processes is made in accordance with the current characteristic(s) of said signal so that an estimating process is selected which is most suitable in view of the current characteristic(s) of said signal.

In accordance with a second aspect of the present invention, there is provided a device for estimating the signal to interference ratio of a signal, in particular in a base station of a WCDMA system, comprising at least a first estimating means for carrying out a first estimating process and a second estimating means for carrying out a second estimating process, a detecting means for detecting the current characteristic(s) of said signal, and a selecting means for selecting an estimating means which is most suitable in view of the current characteristic(s) of said signal detected by said detecting means.

Accordingly, the present invention proposes the alternative use of a plurality of different estimators, wherein the basis for choosing the most suitable estimator is the current characteristic(s) of the signal to be processed. So, by selecting the most suitable estimating process in view of the current characteristic(s) of the signal, the estimating process can be 'adapted' to the current signal such that good quality of the SIR estimate can be maintained and e.g. further the required computing load can be kept reasonable low. Namely, when the current characteristic(s) is (are) changed, the estimating process is changed, accordingly, and, when the new current characteristic(s) of the signal has (have) been detected, another estimating process among the plurality of estimating processes is selected which is then most suitable in view of the new current characteristic(s) of the signal. It has been found for most applications that a possible delay between the change of the current characteristic(s) of the signal and the change of the estimating process doesn't matter, because the SIR estimate has anyway a lot of variance from timeslot to timeslot. Therefore, the present invention is very useful in processing signals having different characteristics.

Further advantageous embodiments are defined in the dependent claims.

Usually, the first estimating process comprises a wideband interference estimation calculated from the wideband signal, i.e. the signal before despreading, and said second estimating process comprises a narrowband interference estimation calculated from the narrowband signal, i.e. the signal after despreading. When small variance is wanted and the biasing is not relevant, the wideband interference estimation should be selected. However, when the biasing becomes a problem, the narrowband interference estimation should be selected.

A current characteristic may comprise a bit rate of said signal so that the basis for choosing the estimator is the bit rate. In a preferred embodiment, said first estimating process is used when said signal has a low bit rate, and said second estimating process is used when said signal has a high bit rate.

Further, a current characteristic may also comprise the kind of said signal, wherein preferably said signal can comprise a speech signal or a data signal. In a preferred embodiment, said first estimating process is used when said signal comprises a speech signal, and said second estimating process is used when said signal comprises a data signal.

In a still further preferred embodiment, said first estimating process is used when said signal comprises a speech signal or a data signal having a low bit rate, and said second estimating process is used when said signal comprises a data signal having a high bit rate.

So, the present invention is very advantageous to be used in telecommunication systems, in particular radio links of a WCDMA system. In such a system, there can be simultaneously many speech connections having a low bit rate, but only a few data connections having a high bit rate in one cell or sector of such a system. This comes from the high interference level caused by high bit rate connections. Other limits for many high bit rate connections could be decoding resources in the receivers of such systems. So, the wideband interference estimation process is a good choice for speech, and the narrowband interference estimation process is a good choice for data connections. I. e. the SIR estimate based on narrowband interference is used with data connections, and the SIR estimate based on wideband interference is used with speech connections. This balances the computing load and keeps the SIR estimate unbiased. Before a connection is made, the bit rate is detected, and the suitable estimation process can be chosen. If the bit rate is changed during the connection, the estimation process can be changed when the new bit rate is detected. Finally, data connections with lowest bit rate could also be switched to use the wideband interference estimation process if the signal processing resources are getting low. A possible delay between the change of the bit rate and the change of the estimation process doesn't matter, because the SIR estimate has anyway a lot of variance from timeslot to timeslot.

However, further selection criteria can be used for selecting the most convenient estimating process. For instance, the spreading factor of the DPDCH channel can be used as an alternative or additional selection criterion, if a spreading factor detection algorithm is implemented wherein the characteristic of the signal is updated once in a timeslot.

BRIEF DESCRIPTION OF THE DRAWING

In the following, the present invention will be described in greater detail based on a preferred embodiment with reference to the accompanying FIGURE in which a preferred embodiment of a device for SIR estimation is shown.

DESCRIPTION OF THE PREFERRED EMBODIMENT

Figure 1:
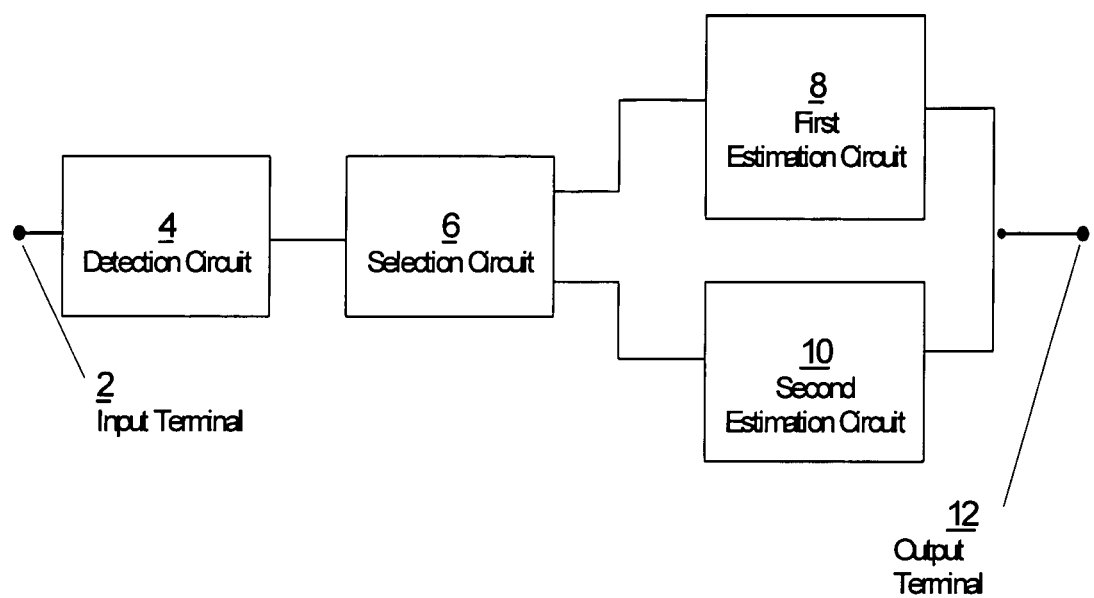

The preferred embodiment of the present invention will now be described on the basis of the enclosed only FIGURE.

The device for SIR estimation shown in the enclosed FIGURE comprises an input terminal 2 which is connected to the input of a detection circuit 4. The output of the detection circuit 4 is coupled to a selection circuit 6.

There are provided a plurality of estimation circuits which are coupled to the outputs of the selection circuit so that the number of estimation circuits corresponds to the number of the outputs of the selection circuit. The present embodiment as shown in the enclosed figure comprises two estimation circuits, namely a first estimation circuit 8 coupled to a first output of the selection means 6 and a second estimation circuit 10 coupled to a second output of the selection circuit 6. Each output of the estimating circuits 8, 10 is connected to a common output terminal 12.

In the present embodiment as shown in the enclosed FIGURE, the first estimation circuit 8 is provided for carrying out a SIR estimation with a wideband interference estimation, and the second estimation circuit 10 is provided for carrying out a SIR estimation with a narrowband interference estimation.

The current characteristics of the signal inputted at the input terminal 2 is detected by the detection circuit 4. In accordance with the detection result of the detection circuit 4, the selection circuit 6 activates either the first estimation circuit 8 or the second estimation circuit 10. The result of either the first estimation circuit 8 or the second estimation circuit 10 is outputted as SIR estimate value at the output terminal 12.

In the preferred embodiment, the signal is either a speech signal having a low bit rate or a data signal having a high bit rate in a telecommunication system e.g. comprising a WCDMA system. Accordingly, the detection circuit 4 is provided to detect the bit rate, and the selection circuit 6 is provided either to activate the first estimation circuit 8 when the signal is a speech signal or to activate the second estimation circuit 10 when the signal is a data signal with a high bit rate. Although data signals in telecommunication systems usually have a high bit rate, data signals can also be processed by the first estimation circuit 8 in case they are data signals with lowest bit rate if the signal processing resources are getting low.

However, further selection criteria can be used for selecting the most convenient estimating process. For instance, the spreading factor of the DPDCH channel can be used as an alternative or additional selection criterion, if a spreading factor detection algorithm is implemented wherein the characteristic of the signal is updated once in a timeslot.

In telecommunication systems the preferred embodiment shown in the enclosed FIGURE is used for detecting and signalling the bit rate and accordingly to choose the correct SIR estimation method before the connection is made. If the bit rate is changed during the connection, the SIR estimation method can be changed by the selection circuit 6 when the new bit rate is detected by the detection circuit 4.

Although the preferred embodiment shown in the enclosed FIGURE is described as being used in telecommunication systems, it might be also useful for other applications. Further, although the preferred embodiment comprises two estimation circuits only, the number of such circuits is not limited thereto, but can be more than two if required.

Although the present invention has been fully described in connection with the preferred embodiment thereof with reference to the accompanying FIGURE, it is to be noted that various changes and modifications are apparent to those skilled in the art. Such changes and modifications are to be understood as included within the spirit and scope of the present invention as defined by the appended claims unless they depart therefrom.

The invention claimed is:

1. A method comprising:
    in particular in a base station of a WCDMA system, providing at least a first estimating process and a second estimating process, the method being used for estimating a signal to interference ratio of a signal,
    wherein for current use with the signal a selection among said estimating processes is made in accordance with a current characteristic or current characteristics of said signal so that an estimating process is selected which is adapted to the current characteristic(s) of said signal,
    wherein said first estimating process comprises a wideband interference estimation calculated from the wideband signal, that is the signal before despreading, and said second estimating process comprises a narrowband interference estimation calculated from the narrowband signal, that is the signal after despreading,
    wherein said first estimating process is used when said signal has a lower bit rate than signal used for second estimating process, and said second estimating process is used when said signal has a higher bit rate than signal used for first estimating process.

2. The method according to claim 1, wherein a current characteristic comprises a bit rate of said signal.

3. The method according to claim 1, wherein a current characteristic comprises a kind of said signal.

4. The method according to claim 3, wherein said signal comprises a speech signal or a data signal.

5. The method according to claim 1, wherein said first estimating process is used when said signal comprises a speech signal, and said second estimating process is used when said signal comprises a data signal.

6. The method according to claim 1, wherein said first estimating process is used when said signal comprises a speech signal or a data signal having a low bit rate, and said second estimating process is used when said signal comprises a data signal having a high bit rate.

7. A device for estimating a signal to interference ratio of a signal, in particular in a base station of a WCDMA system, comprising:
    at least a first estimator configured to carry out a first estimating process and a second estimator configured to carry out a second estimating process;
    a detector configured to detect a current characteristic or current characteristics or said signal; and
    a selector configured to select an estimator adapted to the current characteristic(s) of said signal detected by said detector, and
    wherein said first estimator is provided for carrying out a wideband interference estimation calculated from the wideband signal, that is the signal before despreading, and
    said second estimator is provided for carrying out a narrowband interference estimation calculated from the narrowband signal, that is the signal after despreading,
    wherein said selector selects said first estimator when said detector detects a lower bit rate of said signal than bit rate detected when second estimator is selected, and selects said second estimator when said detector detects a higher bit rate of said signal than bit rate detected when first estimator is selected.

8. The device according to claim 7, wherein said detector detects a bit rate of said signal as a current characteristic.

9. The device according to claim 7, wherein said detector detects a kind of said signal as a current characteristic.

10. The device according to claim 9, wherein said detector detects whether said signal comprises a speech signal or a data signal.

11. The device according to claim 10, wherein said selector selects said first estimator when said detector detects that said signal comprises a speech signal, and said second estimator when said detector detects that said signal comprises a data signal.

12. The device according to claim 8, wherein said selector selects said first estimator when said detector detects that said signal comprises a speech signal or a data signal having a low bit rate, and said second-estimator when said-detector detects that said signal comprises a data signal having a high bit rate.

13. An apparatus for estimating a signal to interference ratio of a signal, in particular in a base station of a WCDMA system, comprising:
- at least a first estimating means for carrying out a first estimating process and a second estimating means for carrying out a second estimating process;
- a detecting means for detecting a current characteristic or current characteristics or said signal; and
- a selecting means for selecting an estimating means adapted to the current characteristic(s) of said signal detected by said detecting means, and wherein said first estimating means is provided for carrying out a wideband interference estimation calculated from the wideband signal, that is the signal before despreading, and said second estimating means is provided for carrying out a narrowband interference estimation calculated from the narrowband signal, that is the signal after despreading, wherein said selecting means selects said first estimating means when said detecting means detects a lower bit rate of said signal than bit rate detected when second estimating means is selected, and selects said second estimating means when said detecting means detects a higher bit rate of said signal than bit rate detected when first estimating means is selected.

* * * * *